United States Patent [19]

Grimm et al.

[11] Patent Number: 4,504,917
[45] Date of Patent: Mar. 12, 1985

[54] DEVICE FOR CONTROLLING REVERSAL POINTS OF A RECIPROCATING MACHINING MEMBER

[75] Inventors: Hans Grimm, Esslingen-Berkheim; Gunter Richter, Nabern, both of Fed. Rep. of Germany

[73] Assignee: Maschinenfabrik Gehring GmbH & Co KG, Ostfildern, Fed. Rep. of Germany

[21] Appl. No.: 408,738

[22] Filed: Aug. 17, 1982

[30] Foreign Application Priority Data

Aug. 22, 1981 [DE] Fed. Rep. of Germany ....... 3133246

[51] Int. Cl.$^3$ ............................................. G06F 15/46
[52] U.S. Cl. .................................. 364/474; 364/475; 364/142; 408/8; 408/13; 318/626
[58] Field of Search ..................... 364/474, 142, 475; 408/8, 9, 10, 11, 12, 13; 318/626, 663

[56] References Cited

U.S. PATENT DOCUMENTS

| 3,874,205 | 4/1975 | Roch et al. ............................ 364/142 |
| 3,983,376 | 9/1976 | Pozzetti ................................. 364/474 |
| 4,078,198 | 3/1978 | Murakosi et al. .................... 318/663 |
| 4,115,859 | 9/1978 | Brisk et al. ........................... 364/142 |
| 4,122,379 | 10/1978 | Richter et al. ....................... 318/626 |
| 4,245,297 | 1/1981 | Bertram ............................... 364/474 |
| 4,250,441 | 2/1981 | Chapman et al. .................... 318/663 |
| 4,256,999 | 3/1981 | Richter et al. ....................... 318/626 |
| 4,287,460 | 9/1981 | Nozawa et al. ...................... 408/12 |
| 4,345,131 | 8/1982 | Semon et al. ........................ 318/626 |
| 4,365,300 | 12/1982 | Johanson et al. .................... 364/474 |

FOREIGN PATENT DOCUMENTS 496158 3/1976 U.S.S.R. ................................... 408/9

Primary Examiner—Jerry Smith
Assistant Examiner—Louis Woo
Attorney, Agent, or Firm—Kenyon & Kenyon

[57] ABSTRACT

An electrical device for controlling the stroke length of a reciprocating tool carrier of a honing machine by controlling the stroke reversal points of the carrier includes a first compensating circuit for correcting deviations from a predetermined lower reversal point and a second compensating circuit for correcting deviations from a predetermined upper reversal point, the compensating circuits supplying respective reversal point signals to a comparator for comparison with a voltage representing the instantaneous position of the carrier along a stroke path. Each reversal-point signal is a sum of a reference signal, identifying an initial reversal point between the predetermined reversal points, and a composite signal formed as an algebraic combination of difference signals each representing the distance between the carrier and a predetermined reversal point (lower, in the case of the first compensating circuit, or upper, in the case of the second compensating circuit) upon motion reversal of the carrier during a respective reciprocation cycle thereof.

15 Claims, 3 Drawing Figures

DEVICE FOR CONTROLLING REVERSAL POINTS OF A RECIPROCATING MACHINING MEMBER

FIELD OF THE INVENTION

This invention relates to an electrical device for controlling the stroke length of a reciprocating member of a machining assembly, in particular by controlling the locations of the reversal points of the reciprocating member along its stroke path.

BACKGROUND OF THE INVENTION

As described in German Pat. Nos. 2,435,498 and 2,550,770, the stroke length of reciprocating members, e.g., tool carriers, of conventional machining assemblies is controlled by a computing circuit which receives, in the form of electrical signals, measurements of machining parameters such as initial switching delays, temperature changes, oil viscosity and variations in stroke velocity, as well as load and power source output, which might affect the precision of the machining process. The computer calculates or predicts the effect of the parameters' values on the motion of the reciprocating machining member and modifies that motion to compensate for the predicted effects.

One disadvantage of such a stroke length control system is the complexity and expense inherent in providing separate detectors for each parameter being monitored. Moreover, the accuracy of the stroke reversal control can occasionally be seriously impaired when mistakes in the measurements of several parameters combine to cause a single large error in the determination of a reversal point.

OBJECTS OF THE INVENTION

An object of the present invention is to provide a simplified stroke length or stroke reversal control device for a machining assembly having a reciprocating member.

Another object of the present invention is to provide such a device in which the accuracy and speed of stroke length control is enhanced.

SUMMARY OF THE INVENTION

In accordance with the present invention, in an electrical control device for the contactless travel limitation of a tool or workpiece holder which executes a reciprocating machining motion of adjustable stroke length in a machine tool including an actual value transmitter and first and second set point transmitters, the positions of which represent first and second desired values of the two reversal points of the machining motion, a correcting device for compensating disturbances, and a comparator and evaluation device which, upon equality between the actual value and one of the desired values, furnishes a reversal signal controlling the machining motion, these objects are attained by making the correction device for compensating disturbances a stroke control device, which includes: means to compare at least one of the first and second desired values set by the first and second set point transmitters with the actual value to form a difference signal therefrom; means to store the difference signal; means to set a control input for a reversal point which is within the limits of the first and second desired values; and means to add the stored signal and the control input to form a corrected desired value for the desired value which is compared, defining a reversal point.

The particular advantage of this embodiment of the electrical control device resides in the fact that practically all occurring disturbances as a whole are taken into consideration by the correcting device, without the need to pick them up individually, using special measuring devices.

From this the further advantage of measuring errors not being able to add up and the reversing accuracy therefore being increased substantially results.

DETAILED DESCRIPTION

Figure 1:
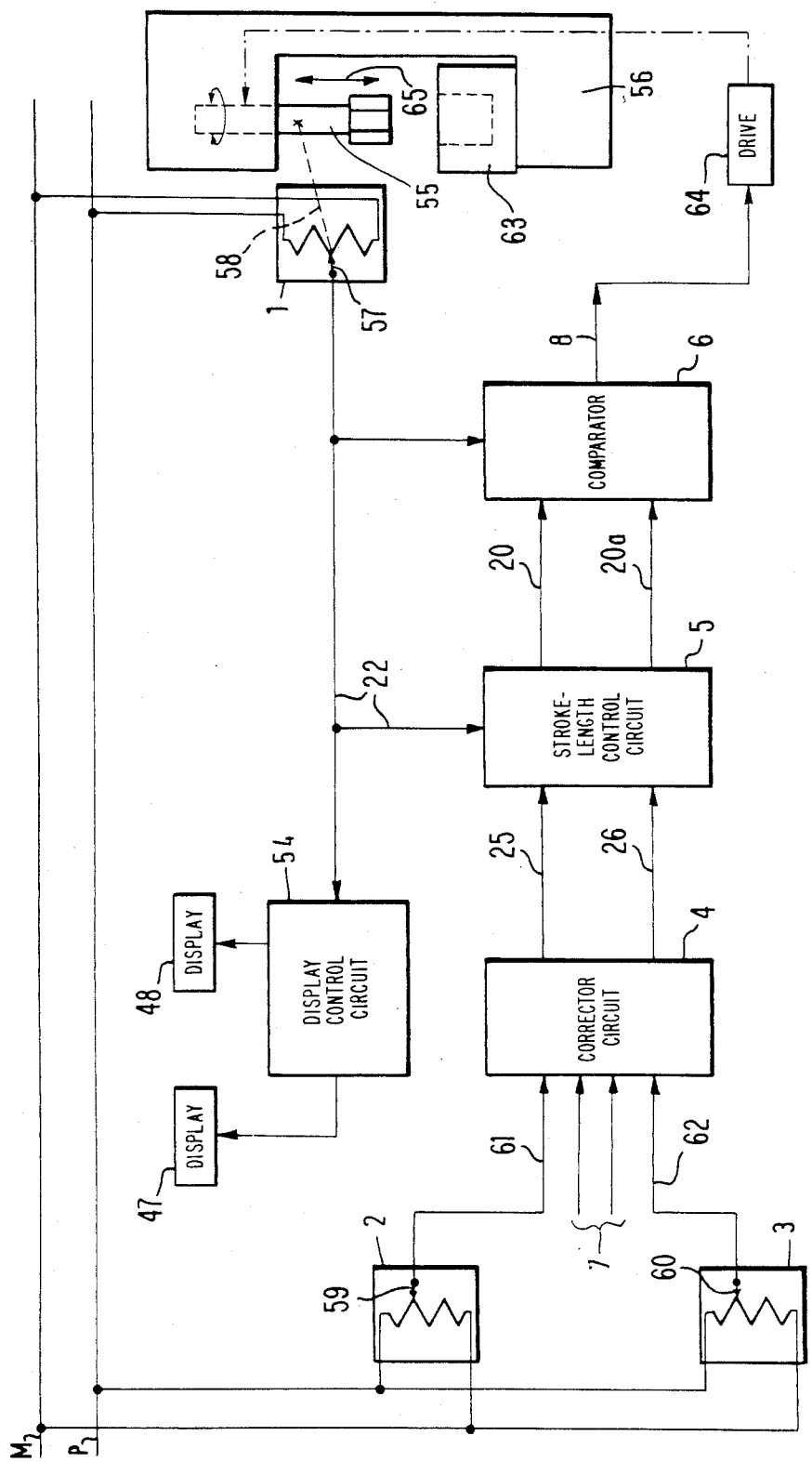
FIG. 1 is a diagrammatic side elevational view of a honing machine in combination with a block diagram of an electrical device according to the present invention for determining the upper and lower reversal points of a reciprocating member of the honing machine, showing a display control circuit and a stroke length or reversal point control circuit.

As illustrated in FIG. 1, an electrical device for controlling the positions of upper and lower stroke reversal points of a reciprocating tool carrier 55 of a honing machine 56 comprises a first potentiometer 1 having a slider or tap 57 operatively connected, e.g., via a chain drive 58, to carrier 55 for monitoring the position thereof along a substantially linear stroke path. Potentiometer 1 has input leads connected to high and low voltage lines P and M and an output lead 22 extending to a stroke length control circuit 5, a comparator and evaluator circuit 6 and an additional control circuit 54 for operating a pair of digital displays 47 and 48. Potentiometer 1 generates, on lead 22, an analog voltage with a level representing the instantaneous vertical position of carrier 55.

Two additional potentiometers 2 and 3 connected across lines P and M have manually adjustable sliders 59 and 60 for varying the voltage levels of a pair of analog signals supplied over leads 61 and 62 to a corrector circuit 4. The voltage levels present on leads 61 and 62 correspond to predetermined lower and upper reversal points of a desired operating stroke of carrier 55.

As described in German Pat. No. 2,559,949, corrector 4 modifies the signals on leads 61 and 62 in accordance with geometrical features of a workpiece 63, the existence and nature of the features being communicated to corrector 4 via input leads 7. Many workpieces will require no modification of the preselected lower and upper stroke reversal points and corrector 4 may accordingly be eliminated.

Stroke length control circuit 5 is connected via leads 25 and 26 from corrector 4 for receiving therefrom analog signals whose voltage levels correspond to the reversal points. Circuit 5 corrects or modifies the incoming analog signals to compensate for disturbances, such as initial switching delays, temperature changes in hydraulic operating fluid and variations in stroke velocity, which might affect the precision of the machining process and outputs the corrected or modified signals to comparator 6 via leads 20 and 20a. It is to be noted that, in contrast to the teachings of German Pat. No. 2,550,770, neither corrector circuit 4 nor control circuit 5 receives signals separately coding the magnitudes of parameters such as oil temperature, stroke velocity, load or power plant output or changes in these parameters.

Comparator and evaluator 6 compares the analog signals arriving from control circuit 5 with the voltage carried via lead 22 from potentiometer 1 and, upon detecting an identity between one of the signals on leads 20 and 20a and the voltage on lead 22, generates a reversing signal on a lead 8 extending to a control input of a reciprocating drive 64 powering carrier 55. In response to the energization of lead 8, drive 64 reverses the motion of carrier 55, the up and down movement of carrier 55 being indicated in FIG. 1 by a double-headed arrow 65.

Figure 2:
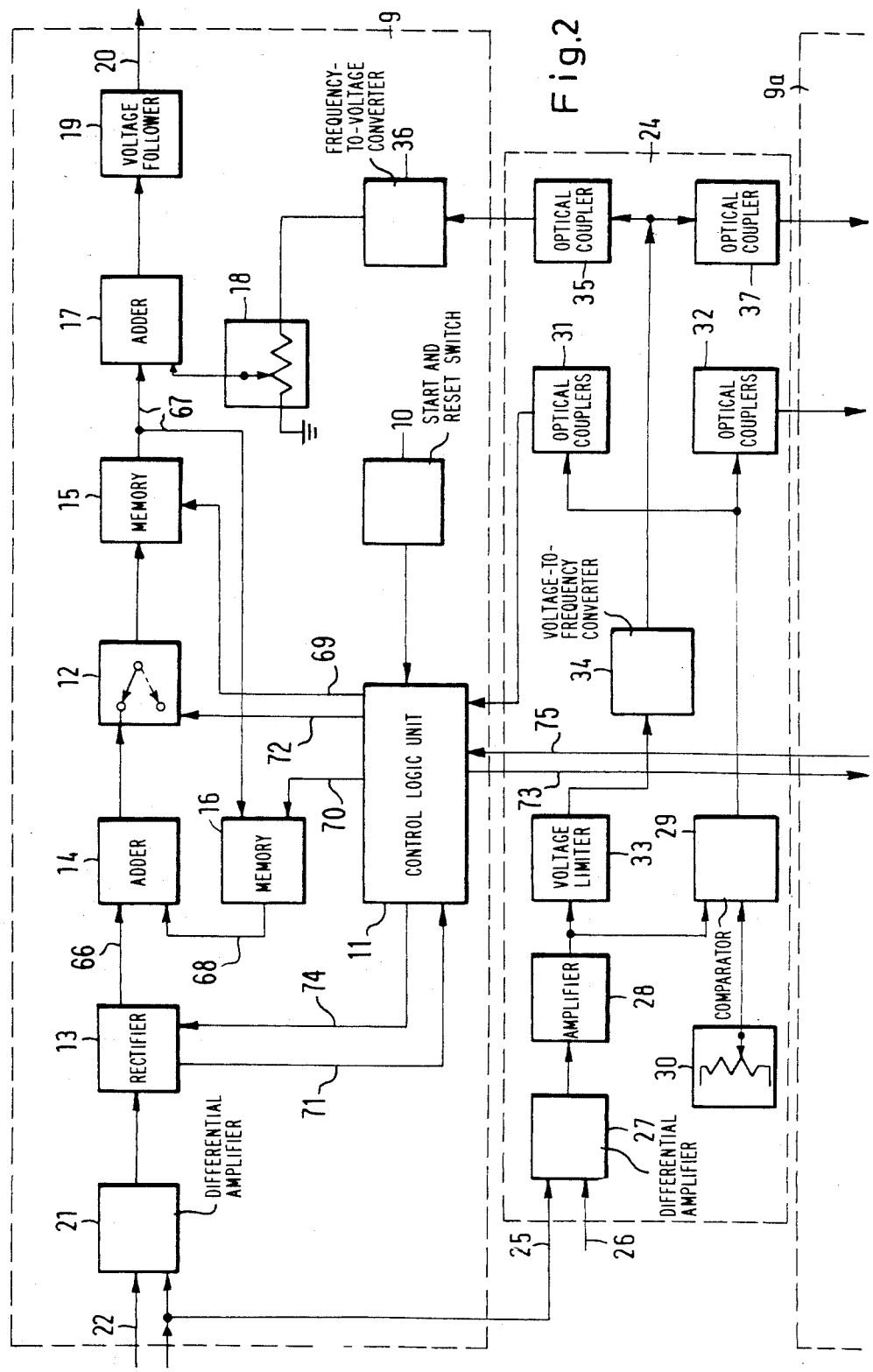
FIG. 2 is a block diagram of the stroke length control circuit of FIG. 1.

As illustrated in FIG. 2, stroke length control circuit 5 comprises a pair of structurally identical compensating circuits 9 and 9a in the form of printed circuit boards. Compensating circuit 9 compares the analog signal on lead 25 with the voltage on lead 22 and provides a corrected lower reversal point signal on lead 20 upon detecting, at the instant the downward motion of carrier 55 is converted into an upward motion, a divergence in the voltage levels on leads 22 and 25. Similarly, circuit component 9a generates a modified upper reversal point signal on lead 20a (see FIG. 1) in response to a lack of identity between the voltage levels on leads 22 and 26 at the instant that carrier 55 attains the uppermost point on its stroke path. Control circuit 5 also includes a monitoring or supervising circuit 24 in part for disabling compensating circuits 9 and 9a upon detecting an error in the lower and upper reversal points manually selected via potentiometers 2 and 3. Like compensating circuits 9 and 9a, supervising circuit 24 is realizable in the form of a printed circuit board.

Compensating circuit 9 includes a differential amplifier 21 having inputs connected to leads 22 and 25 and an output lead extending to a peak rectifier 13. Amplifier 21 subtracts the voltage level on lead 22 from the voltage level of the analog signal lead 25 to form a difference signal fed to rectifier 13, this difference signal representing the instantaneous distance of member 55 from the preselected lower reversal point. Rectifier 13 transmits the incoming difference signal onto an output lead 66 extending to an adder or summing circuit 14 in turn connected to a memory 15 via a double throw switch 12.

Memory 15 has an output lead 67 tied to a first input of another summing circuit 17 (or adder) which has a second input receiving a reference voltage from a potentiometer 18. Adder 17 generates the corrected lower reversal point signal which is transmitted via a voltage follower 19 and lead 20 to comparator 6 (see FIG. 1).

Output lead 67 is also connected to a data input of a memory 16 having an output lead 68 extending to an input of adder 14. Memories 15 and 16 have write-enable inputs energizable by a control logic unit 11 via respective leads 69 and 70 for enabling the input of analog data signals arriving from adder 14 and memory 15, respectively. Control logic unit 11 is activated and reset via a start and reset switch 10.

During a downward operating stroke of carrier 55, the output of adder 14 is connected to the data input of memory 15, switch 12 being in a closed state (as denoted by the solid line in the drawing). Rectifier 13 continuously transmits the voltage level of the difference signal from amplifier 21 onto lead 66. Upon detecting a peak or maximum voltage in the difference signal, rectifier 13 sends a notification signal to logic unit 11 via a lead 71. In response to the signal on lead 71, logic unit 11 energizes leads 69 and 70, thereby enabling data input into memories 15 and 16.

The voltage magnitude of the output signal of rectifier 13 at the instant logic unit 11 enables the data inputs of memories 15 and 16 is a measure of the distance between the preselected lower reversal point and the stroke path point at which the motion on carrier 55 is actually reversed. Thus amplifier 21 and rectifier 13 cofunction to monitor the difference in voltage levels between the signals on leads 22 and 25 and to provide an output signal which, upon a reversal in carrier motion at the lower end of the operating stroke, is a measure of the distance the actual lower reversal point must be shifted in order to coincide with the predetermined lower reversal point.

Upon generating write-enable signals on leads 69 and 70 at the end of a downward stroke of carrier 55, logic unit 11 energizes a lead 72 connected to a switching control input of switch 12, the energization of lead 72 causing switch 12 to open (dashed-line position in FIG. 2) and thereby isolate memories 15 and 16 from adder 14. In coincidence with the energization of lead 72, logic unit 11 transmits a signal via a lead 73 to a logic unit in compensating circuit 9a, structurally identical to logic unit 11, for informing circuit 9a of the onset of the tool carrier's upward stroke. In response to the signal on lead 73, the control logic unit of modifying circuit 9a closes a switch therein identical in structure and similar in function to switch 12, thereby enabling circuit 9a to compare the voltage on lead 22 with the level on the analog signal carried on lead 26 and to emit a modified upper reversal point signal on lead 20a (see FIG. 1) upon detecting a divergence in the compared signals. Thus, compensating circuit 9a serves to shift the actual upper reversal point on carrier 55 until it coincides with the preselected upper reversal point.

Upon receiving a notification signal via lead 71 from rectifier 13, logic unit 11 resets rectifier 13 by generating a signal on a lead 74. Rectifier 13 is reset twice during each reciprocation cycle of carrier 55, i.e., each time a reversal point is negotiated. It is at these instants that rectifier 13 notifies logic unit 11 that a local extremum, whether a valley or a peak, has been reached in the difference signal arriving from amplifier 21. Alternatively, logic unit 11 could reset rectifier 13 once per reciprocation cycle, i e., upon receiving from modifying circuit 9a via a lead 75 a signal indicating the end of an upward stroke and the beginning of a downward stroke of carrier 55. A signal on lead 75 also serves to induce logic unit 11 to de-energize lead 72, thereby closing switch 12 and connecting the output on adder 14 to the data input of memory 15.

An initial operating cycle of compensating circuit 9, corresponding to a first downward stroke of tool carrier 55 during a machining process, is begun by the activation of logic unit 11 via start-reset switch 10. Upon activation, unit 11 sends a reset signal to rectifier 13 via lead 74 and de-energizes lead 72 to connect adder 14 to memory 15. If necessary, logic unit 11 may also send reset signals to memories 15 and 16 for clearing them of signals stored during a preceding machining operation. Because the contents of memory 15 are zero during the initial operating cycle of compensating circuit 9, adder 17 receives a zero-level signal on lead 67 and a non-zero reference signal from potentiometer 18, this reference signal being transmitted to comparator 6 via adder 17, voltage follower 19 and lead 20. In accordance with the present invention, the reference signal generated by potentiometer 18 represents an intermediate point on the stroke path of carrier 55, i.e. a point between the upper reversal point and lower reversal point. The reference signal causes comparator 6 to send a reversing signal to drive 64 via lead 8 substantially prior to the attainment of the preselected lower reversal point by the tool carrier. The consequently early termination of the initial downward stroke of the carrier protects workpiece 63 and the honing tools on carrier 55 from mechanical damages due to a late reversal which might result from irregularities such as switching delays in the hydraulic actuating system of honing machine 56.

During the initial downward stroke of carrier 55, amplifier 21 transmits a constantly increasing negative voltage to rectifier 13, this negative voltage being the algebraic difference of the voltage levels on leads 22 and 25 and representing the distance between the actual position on member 55 and the preselected lower reversal point. Upon the attainment of a maximum value by the difference signal, rectifier 13 sends a notification signal to logic unit 11 which in turn enables memories 15 and 16 to store the maximum voltage on the difference signal, as temporarily maintained at the output of the rectifier. This maximum voltage passes unchanged through adder 14 because of the zero level contents of memory 16 at initialization.

During the second downward stroke of carrier 55, begun by logic unit 11 upon receiving a signal on lead 75 indicating the termination of the first upward stroke of carrier 55, adder 17 transmits to voltage follower 19 the algebraic sum of the voltages input by memory 15 and potentiometer 18. The effect of this algebraic combination, supplied as a corrected signal from compensating circuit 9 over lead 20, is to shift the actual lower reversal point of carrier 55 downward by the distance between the preselected lower reversal point and the first actual lower reversal point.

Upon the transmission by comparator 6 of a reversing signal on lead 8 (see FIG. 1) and the consequent change in the direction of tool carrier motion, rectifier 13 sends a notification signal to logic unit 11 via lead 71. In response to the notification signal, logic unit 11 generates write-enable signals on leads 69 and 70, thereby enabling memories 15 and 16 to store the voltage level present at their data inputs. The data loaded into memory 15 from adder 14 is the algebraic sum of the voltages carried by leads 66 and 68, these voltages being the output signals of the difference monitor formed by differential amplifier 21 and rectifier 13 at the end of the second and the first downward stroke of carrier 55, respectively. Thus, during the third operating cycle of compensating circuit 9, lead 20 transmits to comparator 6 a corrected signal which is an algebraic sum of the reference signal from potentiometer 18 and the first two error coding output signals of rectifier 13, i.e., the signals supplied by rectifier 13 upon a downward to upward change in the motion of carrier 55 during the first two reciprocation cycles thereof.

Upon detecting equality between the voltage levels on leads 22 and 20 (see FIG. 1), comparator 6 emits a stroke reversing signal to drive 64. The monitor formed by amplifier 21, and rectifier 13 subsequently detects the motion change of the tool carrier and notifies logic unit 11 of the fact via lead 71. Logic unit 11 then transfers stroke reversal control to the logic unit of compensating circuit 9a. Prior to transferring control, logic unit 11 energizes lead 72 to open switch 12, as heretofore described.

Upon the return of stroke length control to logic unit 11 at the end of the third upward stroke of carrier 55, unit 11 resets rectifier 13 via lead 74 and closes switch 12 via lead 72. During the fourth downward stroke of the tool carrier, memories 15 and 16 have on their respective outputs a voltage representing the combined error of the first three actual lower reversal points of the tool carrier. Adder 17 algebraically combines the composite signal from memory 15 with the reference signal from potentiometer 18 to produce a corrected signal transmitted to comparator 6 by voltage follower 19 and lead 20 for determining the fourth actual lower reversal point of carrier 55.

In general, each operating cycle of compensating circuit 9, corresponding to respective downward strokes of carrier 55, results in an updated composite signal fed to memories 15 and 16 from adder 14. This composite signal is the algebraic sum of output signals produced by rectifier 13 upon the termination of consecutive downward strokes of carrier 55.

The operation of compensating circuit 9a is the same as the operation of compensating circuit 9. A differential amplifier (not shown) of circuit 9a is connected to leads 22 and 26 and monitors the distance between the tool carrier and the preselected upper reversal point, while a potentiometer (not shown) of circuit 9a, corresponding to potentiometer 18 of circuit 9, supplies a reference signal which defines an initial upper reversal point generally located between the preselected upper reversal point and the initial lower reversal point defined by the reference signal output of potentiometer 18.

Should the actual reversal point at the lower end of the tool carrier's stroke path coincide with preselected lower reversal point, the difference signal at the output of rectifier 13 will be of zero voltage, the sum of the preceding difference or error signals being transferred from memory 16 through added 14 to memory 15. Thus, the actual lower reversal point is stabilized at the selected lower reversal point. If at a later time in the machining process the actual lower reversal point fails to coincide with the selected lower reversal point, owing perhaps to disturbances such as a change in the machining resistance of workpiece 63 or variations in tool carrier velocity, the deviation is immediately detected by amplifier 21 and rectifier 13 and quantified in the form of a difference signal sent to adder 14 via lead 66 for summation with a composite signal stored in memory 16, this composite signal representing the sum of all the difference signals generated during the current machining process. The updated composite signal is transmitted from adder 14 to adder 17 via switch 12 and memory 15 for summation with the reference signal from potentiometer 18, the resulting sum being an updated or corrected lower reversal point signal transmitted by voltage follower 19 and lead 20 to comparator 6 for compensating the detected reversal point deviation. Thus, deviations in the reversal points of the tool carrier's reciprocating motion are detected and compensated within a single reciprocation cycle.

Supervising circuit 24 includes a differential amplifier 27 connected to potentiometers 2 and 3 via leads 61 and 62, corrector circuit 4 and leads 25 and 26 for receiving the analog signals coding upper and lower reversal points. Amplifier 27 sends to another amplifier 28 an output signal which is the difference in voltage level between the signals carried by leads 25 and 26, this difference signal representing the distance between lower and upper reversal points on the tool carrier's stroke path. The difference signal is transmitted from amplifier 28 to a first input of a voltage comparator 29 having a second input connected to the slider or tap of a potentiometer 30. The voltage transmitted from potentiometer 30 to comparator 29 represents a minimum stroke length for honing machine 56 and is preferably chosen with due regard for the physical limitations of the machine.

Upon discovering that the voltage of the difference signal from amplifiers 27 and 28 has fallen below the level set by potentiometer 30, comparator 29 emits a disabling signal to the logic units 11 of compensating and modifying circuits 9 and 9a via respective optical couplers 31 and 32 (for maintaining current separation). The disabling signal from comparator 29 induces both logic units 11 to energize their respective output leads 72, thereby opening double throw switches 12 and interrupting the updating on the composite signal contained in memories 15 and 16.

A stroke length control circuit 5 according to the present invention is provided with means for automatically increasing (or decreasing) the distance between the selected lower reversal point and the initial lower reversal point in accordance with increasing (or decreasing) stroke length of carrier 55 as determined by the setting of potentiometers 2 and 3. This automatic variation in the position on the initial lower reversal point is implemented by a circuit comprising a voltage limiter 33, a voltage-to-frequency converter 34, an optical coupler 35 and a frequency-to-voltage converter 36 connected in series between amplifier 28 and potentiometer 18. This arrangement varies the source voltage of potentiometer 18 in response to changes in the selected stroke length. Another optical coupler 37 is provided for connecting converter 34 to compensating circuit 9a.

Figure 3:
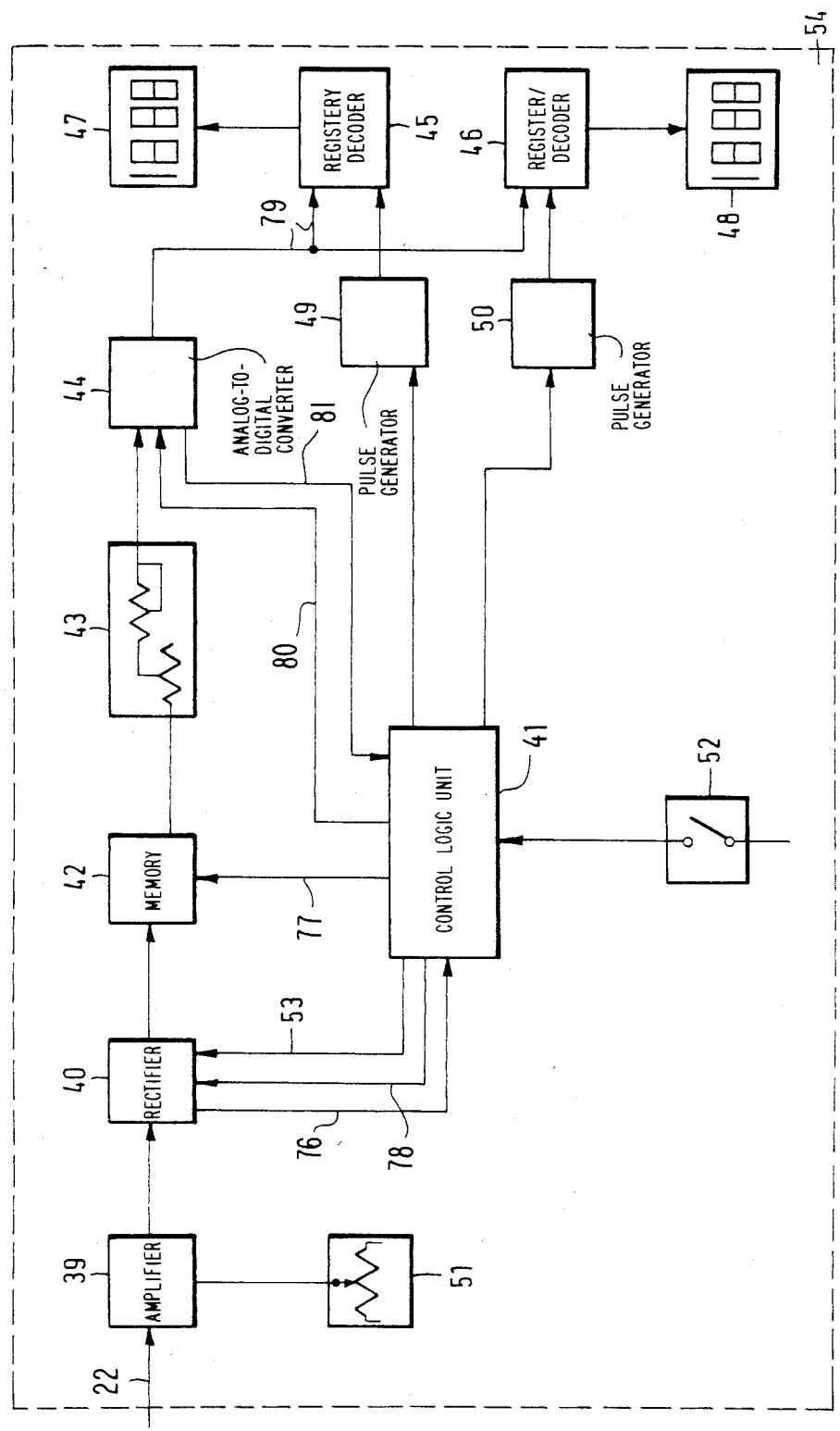
FIG. 3 is a block diagram of the display control circuit of FIG. 1.

As illustrated in FIG. 3, display control circuit 54 includes an amplifier 39 having an input connected to lead 22 and its output connected to a peak rectifier 40. Upon detecting a local maximum or peak in the voltage transmitted from amplifier 39, rectifier 40 sends a signal to a control logic unit 41 via a lead 76. In response to this signal indicating the attainment of an upper or lower reversal point by tool carrier 55 (FIG. 1), logic unit 41 energizes a lead 77 extending to an enabling input of a memory 42. The enabling signal carried by lead 77 causes memory 42 to load, at a data input, a voltage transmitted from rectifier 40. Upon the completion of the writing or loading process in memory 42, logic unit 41 sends a resetting signal to rectifier 40 via a lead 78.

The analog voltage loaded into memory 42 is a measure sure of the position of the tool carrier at the instant of motion reversal. This voltage in transmitted over a setting or adjusting element 43 to an analog-to-digital converter 44 which has an output bus 79 extending to a pair of register-decoders 45 and 46. Upon the loading of a new reversal point voltage into memory 42, control logic 41 generates an enabling signal on a lead 80 connected to converter 44. In response to the enabling signal on lead 80, unit 44 converts the analog signal from memory 42 into a digital signal transmitted over bus 79 to register-decoders 45 and 46, converter 44 energizing a lead 81 during the conversion operation.

Register-decoder 45 and 46 control the operation of digital displays 47 and 48, respectively. They are, in turn, controlled by logic unit 41 via respective pulse generators 49 and 50. If the analog voltage converted into digital pulses by unit 44 represents an upper reversal point of carrier 55, logic unit 41 sends a signal to generator 49, causing it to enable the input of the digital signals on bus 79 into the register portion of register-decoder 45. If, on the contrary, the digital signals generated by converter 44 on bus 79 represent a lower reversal point, logic unit 41 induces, via pulse generator 50, the loading of the signals into the register portion of register-decoder 46. The loading at components 45 and 46 occurs only upon the de-energization of lead 81, indicating the completion of signal conversion by unit 44. Moreover, the inclusion of pulse generators 49 and 50 in display control circuit 54 enables the loading of only selected signals into register-decoders 45 and 46, e.g., at a rate of two or three numeral coding signals per component per second, whereby the reading of displays 47 and 48 is facilitated.

The indication of the actual reversal points via displays 47 and 48 substantially facilitates the control and setting of machining parameters, the matching of the tools and the setting up of the machine.

Display control circuit 54 includes a variable voltage source 51 connected to amplifier 39 for setting to zero the indicated position of the upper reversal point on display 47. Setting element 43 is utilizable for adjusting the displayed value of the maximum stroke length which can be attained with honing machine 56.

Upon the closing of a switch 52, logic unit 41 energizes a lead 53 leading into rectifier 40. The energization of lead 53 causes a bridging of the rectifier, the amplified signal from element 39 being fed to analog-to-digital converter 44 through memory 42 and setting element 43 only. Logic unit 41 then de-activates register-decoder 46 via pulse generator 50, causing display 48 to go blank, and periodically energizes register-decoder 45 via pulse generator 49, whereby the actual position of carrier 55 is continually flashed upon display 47. Such a display of the actual position of carrier 55 facilitates the selection of upper and lower reversal points by an operator prior to the beginning of a honing process. During such a reversal point selection phase, initiated by the closing of switch 52, logic unit 41 periodically energizes the write-enable input of memory 42, preferably at a frequency equal to the rate of pulse production by generator 49.

What is claimed is:

1. In an electrical control device for the contactless travel limitation of a tool or workpiece holder which executes a reciprocating machining motion of adjustable stroke length in a machine tool, including an actual value transmitter and first and second set point transmitters, the positions of which represent first and second desired values of the two reversal points of the machining motion, a correction device for compensating disturbances, and a comparator and evaluation device which, upon equality between the actual value and one of the desired values, furnishes a reversal signal controlling the machining motion, the improvement comprising the correction device for compensation disturbances being a stroke control device, including:

(a) difference forming means operatively connected to said transmitters for comparing at least one of the first and second desired values set by the first and second set point transmitters with the actual value to form therefrom a difference signal representing at least in part the magnitude of the difference between said actual value and said one of the first and second desired values;

(b) memory means operatively coupled to said difference forming means for receiving therefrom and at least temporarily storing said difference signal;

(c) setting means for setting a control input for an initial reversal point which is within the limits of said first and second desired values; and (d) summing means operatively connected to said memory means and to said setting means for adding said difference signal and said control input to form a corrected desired value for the desired value compared in said difference forming means, defining an updated reversal point.

2. The improvement according to claim 1, wherein said stroke control device includes a control circuit for an upper reversal point and a control circuit for a lower reversal point of the machine motion, each of the said control circuits having: a setting element to set said control input; an input stage having an input operatively connected to the actual value transmitter for receiving the measured actual value and an input operatively connected to one of said set point transmitters for receiving one of said first and second desired values, to develop said difference signal; algebraic combination means operatively linked to said input stage for forming the sum of a series of successive difference signals formed by said input stage over a plurality of strokes; storage means operatively connected to said algebraic combination means for storing said sum of said difference signals over a plurality of strokes; an adder operatively coupled to said storage means and said setting element for receiving as inputs said sum of said difference signals and the value supplied by said setting element, the corrected desired value signal for the reversing of machining motion being derived from the output of said adder.

3. The improvement according to claim 2, wherein said storage means comprises a main memory for storing said sum of said difference signals.

4. The improvement according to claim 3, and further including: an intermediate memory; means to transfer the difference value of a preceding machining operation from said main memory to said intermediate memory, and a further adder, the output of said intermediate memory together with the difference value of the subsequent machining operation being fed to said further adder, the output of said further adder being stored in said main memory.

5. The improvement according to claim 4, and further including a logical control unit in each of said control circuits coupled to sense the difference value determined at the input of each control circuit for storage in said main memory, and coupled to trigger the switching from the one control circuit to the other control circuit.

6. The improvement according to claim 5, and further including in each of said control circuits a double throw switch coupling the input stage of the respective control circuit to said main memory thereof, said logic unit being coupled to control said switch.

7. The improvement according to claim 6, and further including in each of said control circuits a starting-resetting circuit coupled to one input of the respective double throw switch in a start position upon start of machine operation.

8. The improvement according to claim 4, wherein the output of said intermediate memory is coupled to said adder in said input stage.

9. The improvement according to claim 2 wherein said setting element is adjustable in dependence on the set stroke and the disturbances expected.

10. The improvement according to claim 2, wherein said input stage of each of said control circuits comprises a differential amplifier, a controlled peak rectifier and an adder.

11. The improvement according to claim 2, wherein said stroke control device further includes a monitoring circuit adapted to turn the control circuits off if the desired values are adjusted incorrectly.

12. The improvement according to claim 11, wherein said monitoring circuit is coupled to the two setting elements of the control circuits in such a manner that the stroke for the machining motion can be shortened automatically as a function of the predetermined stroke by varying said setting elements.

13. The improvement according to claim 11 or 12, wherein said monitoring circuit includes: a differential amplifier to which the output of said two desired value transmitters are connected; and means for evaluating the output of said differential amplifier for turning off the control device if the desired value is set incorrectly, and for controlling the setting elements which determine the stroke shortening.

14. The improvement according to claim 13, and further including a correction stage coupling said set point transmitters to the stroke control device, said correction stage changing the desired values based on the workpiece geometry.

15. The improvement according to claim 1, and further including a display device, which indicates the reversal points, connected to said actual value transmitter.

* * * * *